United States Patent [19]
Torre, Jr. et al.

[11] Patent Number: 6,054,093
[45] Date of Patent: *Apr. 25, 2000

[54] SCREEN PRINTING SHAPED ARTICLES

[75] Inventors: Earl Robert Torre, Jr., Woodstock, Conn.; Michael D. Kavanaugh, North Grafton, Mass.

[73] Assignee: Saint Gobain-Norton Industrial Ceramics Corporation, Worcester, Mass.

[ * ] Notice: This patent is subject to a terminal disclaimer.

[21] Appl. No.: 08/325,744

[22] Filed: Oct. 19, 1994

[51] Int. Cl.[7] .................................................... C04B 33/32
[52] U.S. Cl. ........................... 264/621; 264/660; 264/681
[58] Field of Search ........................... 264/56, 66, 297.7, 264/297.6, 297.1, 297.9, 621, 660, 681

[56] References Cited

U.S. PATENT DOCUMENTS

| | | | |
|---|---|---|---|
| 4,537,647 | 8/1985 | Foster | 156/245 |
| 4,744,802 | 5/1988 | Schwabel | 51/309 |
| 5,009,676 | 4/1991 | Rue et al. | 51/309 |
| 5,090,968 | 2/1992 | Pellow | 51/293 |
| 5,201,916 | 4/1993 | Berg et al. | 51/293 |
| 5,409,645 | 4/1995 | Torre, Jr. | 264/28 |

OTHER PUBLICATIONS

Principles of Ceramic Processing, Second Edition, by Reed pp. 566–569, 1995.

*Primary Examiner*—Christopher A. Fiorilla
*Attorney, Agent, or Firm*—David Bennett

[57] ABSTRACT

Shaped ceramic articles can be obtained by screen printing the desired shapes from a dimensionally stable dispersion of a precursor of the ceramic onto a surface, drying the screen printed shapes so obtained and firing them to generate the shaped ceramic articles.

11 Claims, 2 Drawing Sheets

SCREEN PRINTING SHAPED ARTICLES

BACKGROUND TO THE INVENTION

The present invention relates to a process for forming shaped ceramic articles such as for example abrasive particles with a high degree of flexibility and productivity. It relates particularly to shaped articles made from a dispersion of an alpha alumina precursor.

Shaped alumina articles in the form of filamentary abrasive particles made by a seeded sol-gel process have been shown, in U.S. Pat. No. 5,009,676, to have certain significant advantages over grains having random shapes made by grading crushed larger pieces of abrasive. Methods of forming such shaped grains are disclosed in U.S. Pat. Nos. 5,090,968 and 5,201,916. Other kinds of shaped article made from sol-gel alumina such as discs and fibers and thin sheets have also been described. Most of these processes are however not well adapted to the manufacture of very small shaped abrasive particles.

A new and very flexible process for the production of shaped alumina articles has now been devised that allows very rapid and efficient production from a dispersion of a precursor material. The process of the invention is particularly well adapted to the production of very fine particles by an easily automated technique.

While this invention is very flexible as to the nature of the shapes produced it is particularly adapted to the production of shaped abrasive particles.

SUMMARY OF THE INVENTION

The process of the invention comprises the production of shaped ceramic articles by a screen printing process which comprises applying a dimensionally stable precursor dispersion to a receiving surface through a screen.

A preferred process comprises applying a dispersion of an alpha alumina precursor to one surface of an apertured screen supported on a receiving surface so as to fill the apertures in the screen, removing the screen from the surface and then drying and firing the screen-printed shapes remaining on the surface to form sintered shaped articles of alpha alumina.

The dispersion used must be dimensionally stable and by this meant that a simple shape formed from the dispersion in the screen printing process of the invention must retain its shape when the screen is removed for long enough for the shape to be dried and fired. This stability could be achieved by the use of additives where a gel of the precursor is not readily obtained. The solids content of the dispersion is a critical factor in the invention if shape retention is not achieved by the use of additives. At the lower solids contents it may be necessary to adjust the viscosity to prevent loss of shape when the screen is removed. This may be done by addition of a viscosity adjustment agent. Where the dispersion is a gel the preferred technique is peptization using an acid such as nitric acid. If the dispersion has too high a solids content however, there may be difficulty in filling the screen apertures consistently.

The dispersion used in a preferred process is most conveniently a boehmite gel and still more preferably a boehmite gel that comprises finely dispersed seed particles capable of nucleating the conversion of alumina precursors to alpha alumina.

The apertured screen can be made from any suitable material such as stainless steel, plastic such as PTFE, EVA, polyester or nylon, heavy duty paper and the like. Screen printing is a well-known procedure and materials generally suitable for producing the screens are generally also useful in this invention.

The shape of the apertures is not critical and may be selected according to the nature of the articles. It will however be clear that the process offers a method of producing virtually identical shapes in large quantities or, if desired, an exact mix of a variety of pre-determined shapes. The preferred application of the process of the invention is the production of shaped ceramic abrasive particles. These shapes may be angular or round but the most useful are regular rectangular shapes with an aspect ratio, that is the ratio of length to the greatest cross-sectional dimension, of from about 2:1 to about 50:1 and preferably from about 5:1 to about 25:1. It will be appreciated that a limitation on the dimensional variation is imposed by the thickness of the screen. If the thickness is too great the dispersion is not readily released from the apertures when the screen is removed. Thus unless resort to treating the screen with release agents such as silicones, fluorocarbons or hydrocarbon derivatives, the maximum thickness for screen printing is typically about 10 mm and more typically 3 mm or less. However if flat shapes are desired, this limitation of screen printing may not be significant.

DETAILED DESCRIPTION OF THE INVENTION

The dispersion that is employed in the process of the invention may be any dispersion of a ceramic precursor and by this is intended a finely dispersed material that, after being subjected to the process of the invention, is in the form of a shaped ceramic article. The precursor may be chemically a precursor, as for example boehmite is a chemical precursor of alpha alumina; a morphological precursor as for example gamma alumina is a morphological precursor of alpha alumina; as well as (or alternatively), physically a precursor in the sense of that a finely divided form of alpha alumina can be formed into a shape and sintered to retain that shape.

Where the dispersion comprises a physical or morphological precursor as the term is used herein, the precursor is in the form of finely divided powder grains that, when sintered together, form a ceramic article, such as an abrasive particle of utility in conventional bonded and coated abrasive applications. Such materials generally comprise powder grains with an average size of less than about 20 microns, preferably less than about 10 microns and most preferably less than about a micron.

The solids content of a dispersion of a physical or a morphological precursor is preferably from about 40 to 65% though higher solids contents of up to about 80% can be used. An organic compound is frequently used along with the finely divided grains in such dispersions as a suspending agent or perhaps as a temporary binder until the particle has been dried sufficiently to maintain its shape. This can be any of those generally known for such purposes such as polyethylene glycol, sorbitan esters and the like.

The solids content of a chemical precursor that changes to the final stable ceramic form upon heating may need to take into account water that may be liberated from the precursor during drying and firing to sinter the particles. In such cases the solids content is typically somewhat lower such as about 75% or lower and more preferably between about 30% and about 50%. With a boehmite gel a maximum solids content of about 60% or even 40% is preferred and a gel with a peptized minimum solids content of about 20% may also be used.

Articles made from physical precursors will typically need to be fired at higher temperatures than those formed from a seeded chemical precursor. For example, whereas particles of a seeded boehmite gel form an essentially fully densified alpha alumina at temperatures below about 1250° C., particles made from alpha alumina gels require a firing temperature of above about 1400° C. for full densification.

The materials that can be made into shaped ceramic objects using the process of the invention include physical precursors such as finely divided particles of known ceramic materials such as alpha alumina, silicon carbide, alumina/zirconia and CBN. Also included are chemical and/or morphological precursors such as aluminum trihydrate, boehmite, gamma alumina and other transitional aluminas and bauxite. The most useful of the above are typically based on alumina and its physical or chemical precursors and in the specific descriptions that follow the invention is illustrated with specific reference to alumina. It is to be understood however that the invention is not so limited but is capable of being adapted for use with a plurality of different precursor materials.

Other components that have been found to be desirable in certain circumstances for the production of alumina-based articles include nucleating agents such as finely divided alpha alumina, ferric oxide, chromium oxide and other materials capable of nucleating the transformation of precursor forms to the alpha alumina form; magnesia; titania; zirconia; yttria; and rare earth metal oxides. Such additives often act as crystal growth limiters or boundary phase modifiers. The amount of such additives in the precursor is usually less than about 10% and often less than 5% by weight (solids basis).

It is also possible to use, instead of a chemical or morphological precursor of alpha alumina, a slip of finely divided alpha alumina itself together with an organic compound that will maintain it in suspension and act as a temporary binder while the particle is being fired to essentially full densification. In such cases it is often possible to include in the suspension materials that will form a separate phase upon firing or that can act as an aid in maintaining the structural integrity of the shaped particles either during drying and firing, or after firing. Such materials may be present as impurities. If for example the precursor is finely divided bauxite, there will be a small proportion of vitreous material present that will form a second phase after the powder grains are sintered together to form the shaped particle.

The apertured screen used in the screen printing operation can readily be adapted for use in a batch mode or in a continuous mode. Where the screen thickness is at the upper end of the range, (around 10 mm), the screen is not usually flexible enough to use a continuous process in which the screen is in the form of a belt. For most other applications however the preferred operation is in a continuous production mode. In such an automated operation the apertured screen usually takes the form of a driven belt and this implies that the predominant stress on the belt is in the longitudinal direction, that is, it will tend to be stretched. If the apertures are aligned in the direction of movement of the belt, this tendency to stretch will not lead to significant distortion of the cross-section of the particle. This therefore is a preferred feature of belts for use in the process of the invention. Such a shape has the additional advantage that it allows more of the material from which the belt is made to be oriented lengthwise and this contributes to a optimizing the strength of the belt in that direction.

In use the screen printing apertured belt is in contact with flexible belts as it passes through the application zone. The flexible belt therefore should preferably be made from a moisture resistant material to ensure it is not affected by the water or acid content of the gel. Since the belt is also driven, it is preferred that it be relatively inextensible. It should preferably also be substantially smooth so as to avoid the gel penetrating the material of the belt making separation difficult. Many alumina gels have an acid Ph, especially if they have been peptized by addition of an acid, and therefore the preferred belts should have substantial corrosion resistance. The preferred materials meeting these many criteria is stainless steel though other materials such as chrome-plated nickel. Polytetrafluoroethylene, copolymers comprising a fluorinated ethylene monomer component, and polypropylene could be substituted in appropriate circumstances.

Often it is desirable to coat the material of which the screen printing apertured belt is made with a release coating to facilitate removal of the particles from the screen. The release coating can for example be a baked-on fluoropolymer such as that commonly sold under the DuPont Co. trademark "Teflon". Alternatively the coating can be sprayed on before use. Such spray on coating would include organic lubricants such as octanol, decane, hexadecane and the like. It is understood of course the same considerations apply when designing the apertured screen when this is in a different form such as a simple sheet such as might be appropriate for operation in a batch mode.

Since many of the same criteria apples to the choice of the material from which the screen printing apertured belt is made, it is often appropriate to form the support plate from the same material. The conditions to which the screen printing apertured belt and the support plate are exposed during the process usually make a corrosion resistant metal the preferred choice.

Shaped articles that have been fired to form abrasive grains may be incorporated into a bonded abrasivie such as a grinding wheel, or a coated abrasive such as a grinding disc or belt.

DESCRIPTION OF SPECIFIC EMBODIMENTS OF THE INVENTION

Figure 1:
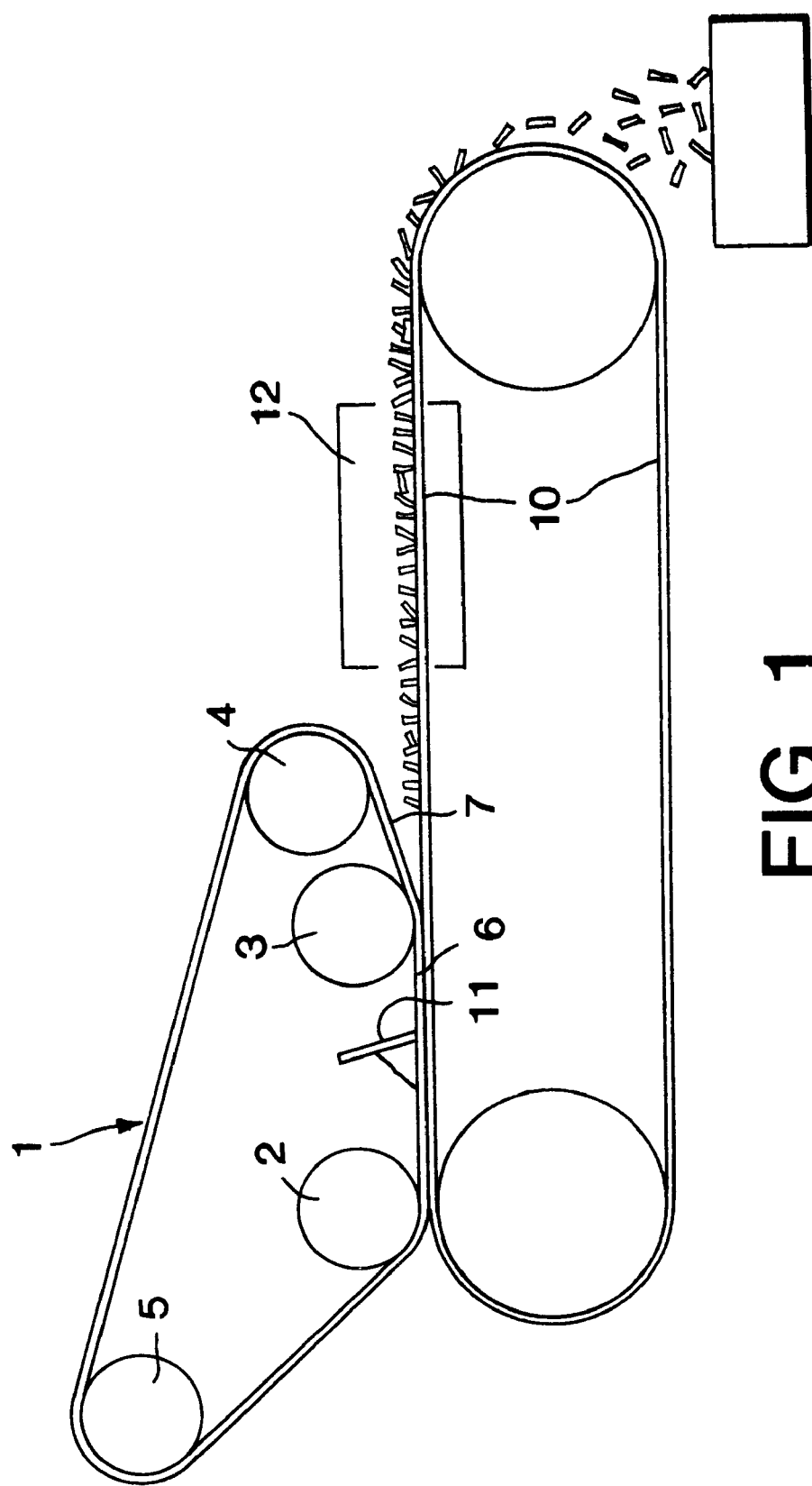
FIG. 1 is schematic representation of a screen printing process according to the invention adapted for operation in a continuous mode.
Figure 2:
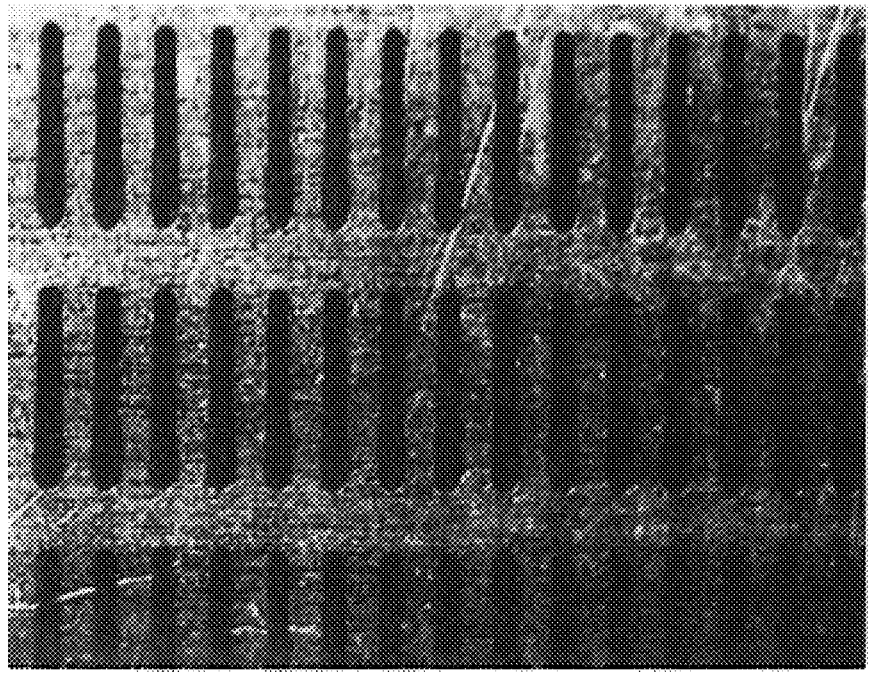
FIG. 2 is a photograph of the top surface of a screen suitable for use in a batch mode screen printing process according to the invention.

The main focus of the discussion in this section of the specification will be on the use of the process of the invention in the production of shaped abrasive particles. The teachings contained herein are adaptable to the production of other shapes such as flat discs, abrasive media for ball mills and the like.

The invention is now described with particular reference to the Drawings. This is for the purpose of illustration only and is not intended to imply any necessary limitation on the essential scope of the invention.

A printing screen, 1, in the form of a continuous belt passes around a series of four rolls, 2, 3, 4 and 5, with the space between rolls 2 and 3 defining an application zone, 6; the space between roll 3 and 4 defining a disengagement zone, 7; the space between rolls 4 and 5 defining a cleaning zone, 8; and the space between rolls 5 and 2 defining a treatment zone, 9.

In the application zone, 6, the screen, 1, is held in firm contact with a continuous stainless steel belt, 10, along its outside surface while both belts move in the same direction at essentially the same speed and a dispersion of abrasive precursor particles is applied to the inside surface of the screen, (application mechanism is not shown), ahead of a doctor blade, 11. The passage beneath the doctor blade forces the dispersion into the apertures in the screen printing belt which at that point is in firm contact with the continuous steel belt, 10.

In the disengagement zone, 7, the screen printing belt is disengaged from the continuous stainless steel belt leaving the screen printed shapes on the surface of the belt, 10. The shapes are transported by the belt to a drying zone, 12, where moisture is withdrawn from the shapes at least to the extent necessary to convert them to particles which retain their structural integrity upon handling. The dried particles are then removed from the continuous steel belt and fired in a suitable furnace to convert them to abrasive particles. Before the belt enters the application zone in contact with the screen printing belt it may be given a release treatment, (such a fluorocarbon spray), if the belt has not been pre-treated to give it a baked-on release layer.

Meanwhile the screen printing belt, after leaving the disengagement zone passes through the cleaning section, 8, in which the belt is first dried and then any residual material is removed by suitably directed brushes, air blasts, combinations of blasts and brushes, or the like.

From the cleaning zone the screen printing belt passes to the treatment zone, 9, in which a release agent may, if desired, be applied to ease the separation of the shapes from the screen printing belt in the disengagement zone.

There are many variations that may be made in the arrangement described in the drawings. For example the application of the dispersion to the screen print belt can be made as the belt passes vertically as opposed to horizontally. The screen printing belt may also be provided by the surface of a single hollow drum with the zones 6 through 9 provided by different segments of the circumference of the drum. All such variations are embraced within the essential scope of this invention.

EXAMPLE 1

Figure 3:
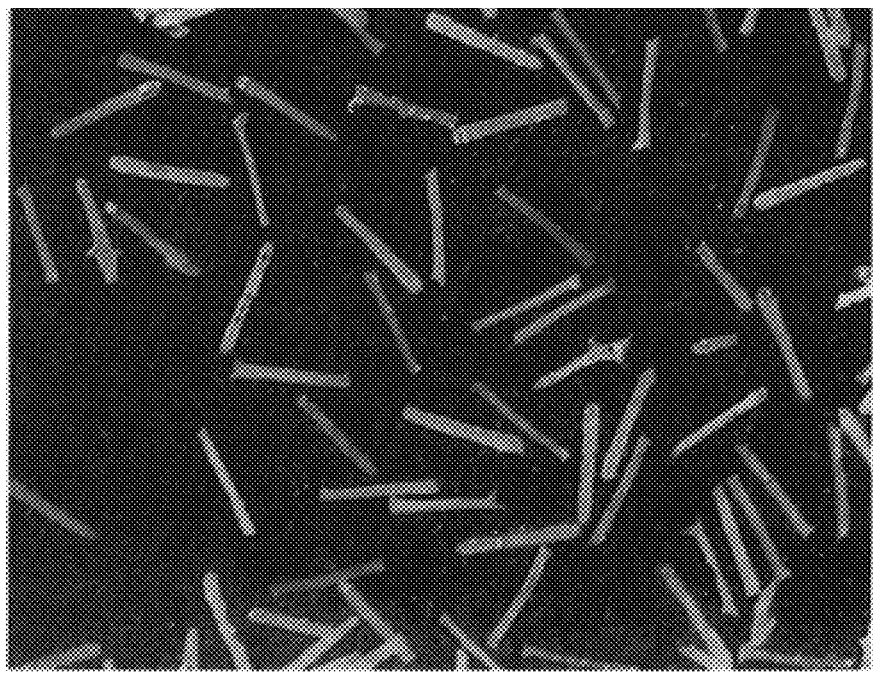
FIG. 3 is a photograph of abrasive particles made using the process of the invention and a screen as described in FIG. 2.

This example illustrates the use of a variation on the process of the invention operated in the batch mode. In this process a flat 0.1 mm thick stainless steel screen printing sheet having a plurality of apertures 1 mm in length and 0.1 mm in width formed therein and substantially as described in FIG. 3 was sprayed with a hydrocarbon release agent and then placed on a flat stainless steel support sheet. A seeded boehmite gel with 30–35% solids was then deposited on the screen printing sheet and forced into the apertures using a doctor blade. The screen printing sheet was removed leaving the gel shapes on the support sheet. The support sheet bearing the gel shapes was then placed in an oven and heated at 80° C. for 5 minutes and then at 1325° C. for a further 3 minutes. The abrasive particles that were obtained are shown in FIG. 3.

The density of the fired particles was 3.92 g/cc (measured by the helium method); the average crystal size by the corrected intercept method was 0.15 micron; the hardness was 18.3 Gpa (under 50 g load); and the loose packed density was 0.9 g/cc. The final dimensions of the particles which were essentially square in crosssection were: length 697 microns, average length of the sides in the cross-section 79 microns, giving an aspect ratio of about 8.7:1. The loose packed density of the grits was 0.9 and the equivalent diameter of the grits was 79 microns.

The abrasive grits according to the invention proved to be highly effective when incorporated in a vitreous bonded grinding wheel.

EXAMPLE 2

In another operation similar to that described above in Example 1, a perforated stainless steel plate was treated to bake on a Teflon FEP fluoropolymer coating. The screen was 0.2 mm thick and the perforations were of rectangular shape with a width of about 0.2 mm and length of about 6.4 mm long. The same application, drying and firing procedures as were described above are used to form filamentary abrasive particles having the following properties:

Density (water) 3.88–3.93 gm/cc

Crystal Size 0.18 micron

Hardness (Vickers, 200 g load) 22.5 Gpa

Equivalent Diameter (Rectangular) 90 micron×135 microns

Aspect Ratio 25:1

Loose Pack Density about 0.5

Other variations of the device and process described can be devised without departing from the essential concept of the invention and it is understood that all such variations are included within the invention described and claimed herein.

What is claimed is:

1. A process for the production of shaped ceramic articles by a screen printing process which comprises applying a dimensionally stable dispersion of a ceramic precursor to a receiving surface through a screen comprising a plurality of apertures, removing the screen from the support surface and then drying and firing the screen-printed shapes remaining on the support surface to form sintered shaped ceramic articles.

2. A process according to claim 1 which comprises applying a dispersion of an alpha alumina precursor to one surface of an apertured screen in contact with a support surface so as to fill the apertures in the screen, removing the screen from the support surface and then drying and firing the screen-printed shapes remaining on the support surface to form sintered shaped articles of alpha alumina.

3. A process according to claim 1 in which the precursor is a chemical precursor.

4. A process according to claim 2 in which the dispersion is a boehmite gel.

5. A process according to claim 4 in which the gel has a solids content of from about 30% to about 60%.

6. A process according to claim 1 in which The apertured screen is resistant to acids and water.

7. A process according to claim 1 in which the apertured screen is in the form of a driven belt.

8. A process according to claim 1 in which the apertures in the belt are adapted to produce shaped filamentary ceramic abrasive particles.

9. A process for the production of shaped alumina ceramic abrasive particles which comprises screen printing shapes of a dimensionally stable boehmite alumina gel onto a support surface, drying and then firing the shapes at a temperature sufficient to convert the alumina to the alpha phase.

10. A process according to claim 9 in which the boehmite alumina gel comprises up to 10% by weight, (solids basis), of additives selected from the group consisting of nucleating agents, magnesia, zirconia, titania, yttria and rare earth metal oxides.

11. A process according to claim 9 in which the particles are screen printed using a continuous apertured belt in which the apertures have the dimensions to produce printed shapes with an aspect ratio of from about 2:1 to about 50:1.

* * * * *